United States Patent
Martinez Bonastre et al.

(10) Patent No.: US 12,438,158 B2
(45) Date of Patent: Oct. 7, 2025

(54) ELECTROCATALYST INK

(71) Applicant: JOHNSON MATTHEY HYDROGEN TECHNOLOGIES LIMITED, Reading (GB)

(72) Inventors: Alejandro Martinez Bonastre, Reading (GB); Daniel Marin Florido, Reading (GB)

(73) Assignee: Johnson Matthey Hydrogen Technologies Limited, Reading (GB)

( * ) Notice: Subject to any disclaimer, the term of this patent is extended or adjusted under 35 U.S.C. 154(b) by 58 days.

(21) Appl. No.: 18/558,666

(22) PCT Filed: Jun. 8, 2022

(86) PCT No.: PCT/GB2022/051434
§ 371 (c)(1),
(2) Date: Nov. 2, 2023

(87) PCT Pub. No.: WO2022/258965
PCT Pub. Date: Dec. 15, 2022

(65) Prior Publication Data
US 2024/0234748 A1    Jul. 11, 2024

(30) Foreign Application Priority Data

Jun. 11, 2021  (GB) .................... 2108369

(51) Int. Cl.
| | |
|---|---|
| *H01M 4/88* | (2006.01) |
| *B01D 15/08* | (2006.01) |
| *B01J 20/22* | (2006.01) |
| *B01J 20/26* | (2006.01) |
| *B01J 20/30* | (2006.01) |
| *H01M 4/92* | (2006.01) |
| *H01M 8/10* | (2016.01) |

(52) U.S. Cl.
CPC .......... *H01M 4/8828* (2013.01); *B01D 15/08* (2013.01); *B01J 20/22* (2013.01); *B01J 20/265* (2013.01); *B01J 20/3085* (2013.01); *H01M 4/8807* (2013.01); *H01M 4/881* (2013.01); *H01M 4/8814* (2013.01); *H01M 4/921* (2013.01); *H01M 4/926* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 4,098,867 A * | 7/1978 | Grinstead | B01J 45/00 423/100 |
| RE37,307 E | 8/2001 | Gore et al. | |
| 7,807,063 B2 | 10/2010 | Liu et al. | |
| 7,867,669 B2 | 1/2011 | Liu et al. | |
| 2006/0065522 A1 | 3/2006 | Liu et al. | |
| 2008/0096078 A1* | 4/2008 | Miyake | H01M 8/103 429/535 |
| 2009/0202869 A1 | 8/2009 | Sawaki et al. | |

FOREIGN PATENT DOCUMENTS

| | | |
|---|---|---|
| WO | 2006/123187 A1 | 11/2006 |
| WO | 2012/080726 A1 | 6/2012 |
| WO | 2013/045894 A1 | 4/2013 |
| WO | 2015/050864 A1 | 4/2015 |

OTHER PUBLICATIONS

Wang et al. "Impact of catalyst ink dispersing methodology on fuel cell performance using in-situ x-ray scattering" (2019).*

Wang Min, et al., "Impact of Catalyst Ink Dispersing Methodology on Fuel Cell Performance Using in-Situ X-ray Scattering", ACS Applied Energy Materials, vol. 2, No. 9, Sep. 23, 2019 (Sep. 23, 2019), pp. 6417-6427, XP055886375, ISSN: 2574-0962, DOI: 10.1021/acsaem.9b01037 abstract p. 6425, col. 2, paragraph 1, figures 6, 7.

Cheng, et al., "A review of PEM hydrogen fuel cell contamination: Impacts, mechanisms, and mitigation", Journal of Power Sources, Elsevier, Amsterdam, NL, vol. 165, No. 2, Feb. 28, 2007 (Feb. 28, 2007), pp. 739-756, XP005914524, ISSN: 0378-7753, DOI: 10.1016/J.JPOWSOUR.2006.12.012; the whole document.

* cited by examiner

*Primary Examiner* — Austin Murata
(74) *Attorney, Agent, or Firm* — BakerHostetler

(57) ABSTRACT

The present invention provides a method of preparing an electrocatalyst ink, the method comprising a step of contacting a dispersion with a separation material.

18 Claims, No Drawings

ELECTROCATALYST INK

FIELD OF THE INVENTION

The present invention provides a method of preparing an electrocatalyst ink. The electrocatalyst ink is used to prepare electrocatalyst layers in high performing membrane electrode assemblies.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the proton exchange membrane fuel cell (PEMFC) the ion-conducting membrane is proton conducting, and protons, produced at the anode, are transported across the ion-conducting membrane to the cathode, where they combine with oxygen to form water.

A principal component of the PEMFC is the membrane electrode assembly, which is essentially composed of five layers. The central layer is the polymer ion-conducting membrane. On either face of the ion-conducting membrane there is an electrocatalyst layer, containing an electrocatalyst designed for the specific electrolytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore, the gas diffusion layer must be porous and electrically conducting.

The electrocatalyst layers also generally comprise a proton conducting material, such as a proton conducting polymer, to aid transfer of protons from the anode electrocatalyst to the ion-conducting membrane and/or from the ion-conducting membrane to the cathode electrocatalyst.

Conventionally, the membrane electrode assembly can be constructed by a number of methods. Typically, the methods involve the application of one or both of the electrocatalyst layers to an ion-conducting membrane to form a catalyst coated ion-conducting membrane. Subsequently, a gas diffusion layer is applied to the electrocatalyst layer. Alternatively, an electrocatalyst layer is applied to a gas diffusion layer to form a gas diffusion electrode, which is then combined with the ion-conducting membrane. A membrane electrode assembly can be prepared by a combination of these methods e.g. one electrocatalyst layer is applied to the ion-conducting membrane to form a catalyst coated ion-conducting membrane, and the other electrocatalyst layer is applied as a gas diffusion electrode. The electrocatalyst layers are applied using an electrocatalyst ink which conventionally comprises an electrocatalyst material, an ion-conducting polymer, solvents and/or diluents, and any agents desired to be included in the electrocatalyst layer.

The electrocatalyst layers generally comprise an electrocatalyst material comprising a metal or metal alloy suitable for the fuel oxidation or oxygen reduction reaction, depending on whether the layer is to be used at the anode or cathode. Electrocatalysts for fuel oxidation and oxygen reduction are typically based on platinum or platinum alloyed with one or more other metals. The platinum or platinum alloy electrocatalyst can be in the form of unsupported nanometre sized particles (for example metal blacks) or can be deposited as discrete very high surface area nanoparticles onto a support material (a supported electrocatalyst). Electrocatalysts can also be in the form of coatings or extended films deposited onto a support material.

A wide range of electrocatalyst concepts, such as platinum binary alloys, platinum, monolayer electrocatalyst, platinum skin electrocatalyst, and nanostructured thin-film (NSTF) electrocatalysts have been investigated. Another approach to high activity electrocatalyst reported is that of the de-alloying Pt-M concept-materials obtained by the synthesis of base metal (M) rich particles which are subjected to a selective leaching process of the less noble metal from the particle surface. The resulting platinum-rich shells of the de-alloyed electrocatalyst particles exhibit compressive strain which, via electronic effects, leads to a highly active oxygen reduction reaction (ORR) catalyst.

SUMMARY OF THE INVENTION

The present inventors realised that the performance of membrane electrode assemblies can be improved by removing base metal contaminants which enter the electrocatalyst layer during preparation of the membrane electrode assembly. For example, base metal species can leach from alloys of platinum group metals with base metals during preparation of electrocatalyst inks due to break up of agglomerates in the presence of acidic ion-conducting polymers. This can lead to lower than expected electrochemical performance of a membrane electrode assembly. Contaminating base metal species can also be present in electrocatalyst layers which do not comprise alloy electrocatalysts. The contaminants may arise from, for example, the manufacturing process used to make the electrocatalyst, or in the manufacture of the ion conducting polymer. Therefore, a need to improve the performance of membrane electrode assemblies contaminated with base metal species was identified.

Accordingly, in a first aspect the present invention provides a method of preparing an electrocatalyst ink, the method comprising the steps of:
  i) preparing a dispersion comprising an electrocatalyst material, an ion-conducting material and a diluent; then
  ii) contacting the dispersion with a separation material comprising picolinic acid ester or picolinic acid amide functional groups immobilised on a solid support.

An electrocatalyst ink is a dispersion comprising an electrocatalyst material, an ion-conducting material and a diluent which, when dried, forms an electrocatalyst layer, preferably an electrocatalyst layer in a fuel cell membrane electrode assembly, preferably a proton exchange membrane fuel cell. Accordingly, the first aspect of the invention may be a method of preparing an electrocatalyst ink for a fuel cell electrocatalyst layer, preferably a proton exchange membrane fuel cell catalyst layer.

The inventors surprisingly found that membrane electrode assemblies containing electrocatalyst layers prepared using inks made by this method may exhibit improved electrochemical performance compared to membrane electrode assemblies containing electrocatalyst layers prepared by methods which do not include step ii).

In a second aspect, the present invention provides a dispersion comprising an electrocatalyst material, an ion-conducting material, a separation material comprising picolinic acid ester or picolinic acid amide functional groups immobilised on a solid support, and a diluent. Such a dispersion is prepared as part of the method of the first aspect of the invention.

In a third aspect, the present invention provides a method of applying an electrocatalyst layer to a substrate, the method comprising the steps of:
  i) preparing an electrocatalyst ink by the method of the first aspect of the invention; then
  ii) applying the electrocatalyst ink onto said substrate and drying the ink to form an electrocatalyst layer. In a fourth aspect, the present invention provides an electrocatalyst layer obtainable by this method.

In a fifth aspect, the present invention provides a method of preparing a gas diffusion electrode, the method comprising applying an electrocatalyst layer to a substrate according to the method of the third aspect of the invention, wherein said substrate is a gas diffusion layer. In a sixth aspect, the present invention provides a gas diffusion electrode obtainable by this method.

In a seventh aspect, the present invention provides a method of preparing a catalysed decal transfer substrate, the method comprising applying an electrocatalyst layer to a substrate according to the method of the third aspect of the invention, wherein the substrate is a face of a decal transfer substrate. In an eight aspect, the present invention provides a catalysed decal transfer substrate obtainable by this method.

In a ninth aspect, the present invention provides a method of preparing a catalyst coated ion-conducting membrane, the method comprising applying an electrocatalyst layer to a substrate according to the method of the third aspect of the invention, wherein said substrate is a face of an ion-conducting membrane. In a tenth aspect, the present invention provides a method of preparing a catalyst coated ion-conducting membrane, the method comprising applying an electrocatalyst layer to an ion-conducting membrane by decal transfer from a catalysed decal transfer substrate prepared according to the method of the seventh aspect of the invention. In an eleventh aspect, the present invention provides catalyst coated ion-conducting membranes obtainable by these methods.

In a twelfth aspect, the present invention provides a method of preparing a membrane electrode assembly, the method comprising the steps of;
  i) preparing a gas diffusion electrode according to the method of the fifth aspect of the invention;
  ii) applying the gas diffusion electrode prepared in step i) to a face of an ion-conducting membrane. In a thirteenth aspect, the present invention provides a membrane electrode assembly obtainable by this method.

In a fourteenth aspect, the present invention provides a method of preparing a membrane electrode assembly, the method comprising the steps of;
  i) preparing a catalyst coated ion-conducting membrane according to the methods of the ninth or tenth aspects of the invention;
  ii) applying a gas diffusion layer to the electrocatalyst layer. In a fifteenth aspect, the present invention provides a membrane electrode assembly obtainable by this method.

In a sixteenth aspect, the present invention provides a fuel cell comprising a membrane electrode assembly according to the invention. Preferably, the fuel cell is a proton exchange membrane fuel cell.

DETAILED DESCRIPTION OF THE INVENTION

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

When an entity is referred to as being "of the invention", a non-limiting example being "an electrocatalyst layer of the invention", this means that the entity is either prepared by the corresponding method of the invention, or is obtainable by the corresponding method of the invention. So an electrocatalyst layer of the invention, for example, is an electrocatalyst layer prepared by the method of the third aspect of the invention, or is an electrocatalyst layer obtainable by the method of the third aspect of the invention (i.e. the fourth aspect of the invention).

The electrocatalyst may be an anode or a cathode electrocatalyst and is preferably a proton exchange membrane fuel cell electrocatalyst. Accordingly, the electrocatalyst may be a hydrogen oxidation reaction (anode) or oxygen reduction reaction (cathode) electrocatalyst. The electrocatalyst material comprises an electrocatalyst which is preferably a platinum group metal or an alloy of a platinum group metal with a base metal, preferably an alloy of a platinum group metal with a base metal. Platinum group metals include platinum, palladium, rhodium, ruthenium, iridium and osmium. The preferred platinum group metals, in both the platinum group metal and alloy electrocatalysts, are platinum, palladium and rhodium, most preferable is platinum. A base metal is tin or a transition metal which is not a noble metal. A noble metal is a platinum group metal (platinum, palladium, rhodium, ruthenium, iridium or osmium) or gold. Suitable base metals in the alloy electrocatalyst are copper, cobalt, nickel, zinc, iron, titanium, molybdenum, vanadium, manganese, niobium, tantalum, chromium and tin. Preferred base metals in the alloy electrocatalyst include nickel, copper, cobalt, and chromium. More preferred base metals are nickel, cobalt and copper. The most preferred base metal is nickel. The ratio of platinum group metal to base metal in the alloy electrocatalyst is typically in the range of and including 3:1 to 1:3. The alloy electrocatalyst may be a de-alloyed electrocatalyst. Put another way, the atomic composition relative to platinum group metal of base metal at the surface of the electrocatalyst is lower than the atomic composition relative to platinum group metal of base metal in the bulk of the electrocatalyst, wherein the bulk is the total composition of the electrocatalyst. For example, the atomic composition relative to platinum group metal of base metal at the surface of the electrocatalyst may be in the range of and including 20 to 99%, 20 to 70% or 30 to 55% of the atomic composition relative to platinum group metal of base metal in the bulk of the electrocatalyst.

The electrocatalyst may be supported or unsupported. Accordingly, the electrocatalyst may be supported on a support material. Put another way, the electrocatalyst material may consist of (or comprise only) an electrocatalyst supported on a support material. The term "supported" will be readily understood by a skilled person. For example, it will be understood that the term "supported" includes the electrocatalyst being dispersed on the support material and bound or fixed to the support material by physical or chemical bonds. For instance, the electrocatalyst may be bound or fixed to the support material by way of ionic or covalent bonds, or non-specific interactions such as van der Waals forces.

The support material may be carbon support material, e.g. a carbon powder, which may be, for example, a carbon black such as a commercially available carbon black (such as from Cabot Corp. (Vulcan® XC72R) or Akzo Nobel (the Ketjen® black series)) or a graphitised version of these carbon blacks or other commercially available carbon blacks such as acetylene blacks (e.g. those available from Chevron Phillips (Shawinigan Black®) or Denka). The support material may also be one specifically designed for use in a fuel cell, such as those described in WO2013/045894.

Alternatively, the support material may be a metal oxide or a mixed oxide, in particular a conductive mixed oxide such as niobia-doped titania, phosphorus-doped tin oxide and mixed platinum group metal oxides or mixed metal oxides as disclosed in WO2012/080726), a carbide (e.g. tungsten carbide, molybdenum carbide or titanium carbide, suitably tungsten carbide or titanium carbide), a nitride, in particular a conductive nitride (e.g. titanium nitride or titanium aluminium nitride).

When the electrocatalyst is supported on a support material, the electrocatalyst loading may be expressed in terms of weight percent active metal, for example weight percent platinum group metal, which can be determined using inductively coupled plasma mass spectrometry (ICPMS). The loading may suitably be at least 10 wt % platinum group metal, typically at least 20 wt % platinum group metal by total weight of the electrocatalyst and the support. The electrocatalyst loading may suitably be no more than 90 wt % platinum group metal, typically no more than 60 wt % platinum group metal, for example no more than 50 wt % platinum group metal by total weight of the electrocatalyst and the support material.

The solid content of the electrocatalyst ink after contact with and, if necessary, removal of, the separation material is not particularly limited and will depend on the printing method which will be used to prepare an electrocatalyst layer from the ink. Solid content includes the electrocatalyst material, the ion-conducting material, and any other solids present. For example, the solid content may be no more than 25 wt % and suitably at least 5 wt % by total weight of the electrocatalyst ink. In particular, an electrocatalyst ink used for screen printing may suitably contain in the range of and including 20 to 25 wt % solids, an electrocatalyst ink used in slot die printing may suitably contain in the range of and including 10 to 15 wt % solids, and an electrocatalyst ink used in gravure printing may suitably contain no more than 10 wt % solids.

The ion-conducting material is, suitably, a proton conducting ionomer. A skilled person understands that an ionomer is a polymer composed of both electrically neutral repeating units and ionizable repeating units covalently bonded to the polymer backbone via side-chains. The ion-conducting material may include ionomers such as perfluorosulphonic acid (e.g. Nafion® (Chemours Company), Aciplex® (Asahi Kasei), Aquivion® (Solvay Specialty Polymer), Flemion® (Asahi Glass Co.), or ionomers based on partially fluorinated or non-fluorinated hydrocarbon sulphonated or phosphonated polymers, such as those available from FuMA-Tech GmbH as the Fumapem® P, E or K series of products, JSR Corporation, Toyobo Corporation, and others. Suitably, the ionomer is a perfluorosulphonic acid which preferably has an EW in the range of and including 600 to 1200 wherein EW, or equivalent weight, is the number of grams of dry polymer per mole of sulfonic acid groups when the material is in the acid form. Particular perfluorosulfonic acid ionomers include the Nafion® range available from Chemours company, especially Nafion® 1100 EW and DE2020CS, the Aquivion® range available from Solvay, especially 830 EW. The ion-conducting material is suitably not in salt form i.e. it is present as the free acid.

The dispersion also comprises a diluent. Suitable diluents include organic solvents and water, preferably mixtures of one or more organic solvents with water. However, water alone may be used as a diluent. The amount of diluent is not particularly limited and will depend on the printing method which will be used to prepare an electrocatalyst layer from the ink. Accordingly, it will be adjusted for the desired solid content, which is discussed above. Suitable organic solvents are alcohol-based solvents, preferably propanols or ethanol, for example propan-1-ol. In mixtures of organic solvents and water, the weight percent of organic solvent by total weight of the diluent is suitably no more than 85 wt % and at least 10 wt %. When the mixture contains no more than 5 wt % organic solvent, for example no more than 1 wt %, and the rest is water, the dispersion may also include a mineral acid as described in WO 2006/123187. A specific example of a diluent is a mixture of propan-1-ol and water, e.g. a mixture of propan-1-ol and water containing about 80 wt % propan-1-ol. An alternative example of a diluent is a mixture of ethanol and water e.g. containing 10 to 50 wt %, suitably about 25 wt % ethanol. An alternative example of a diluent is a mixture of ethanol, propan-1-ol and water which may contain more propan-1-ol than ethanol e.g. 5 to 15 wt %, suitably about 10 wt % ethanol, and 50 to 70 wt %, suitably about 70 wt % propan-1-ol, the remainder being water.

The pH of the dispersion will depend on the nature of the ion-conducting material and is typically less than 3, or less than 2.5. Typically, the pH is greater than 0. For example, the pH of the dispersion may be about 2.

Agglomerate particle break-up is preferably carried out before contact with the separation material by methods known in the art such as high shear mixing, milling, ball milling, passing through a microfluidiser or a combination thereof. Agglomerates may comprise, for example when the electrocatalyst material is supported on a support material, loosely held individual support particles or aggregates held together by weak forces and can be readily broken down into the individual support particles or aggregates by such low energy agitation. Agglomerates of electrocatalyst may also be formed when the electrocatalyst is not supported, and such agglomerates can also be readily broken down.

The separation material used in the present invention comprises picolinic acid amide functional groups, e.g. picolinamide functional groups, or picolinic acid ester functional groups, immobilised on a solid support. Preferably picolinic acid amide functional groups, e.g. picolinamide functional groups. The functional groups may by attached to the solid support via a covalent linker. For example, a picolinamide functional group and its attachment to the solid support may be illustrated by Formula 1:

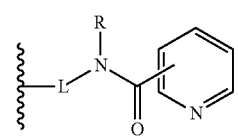

Formula 1 in which L is a covalent linker and R is H or optionally substituted, branched or straight chain C1-C6 alkyl.

The nature of the covalent linker (e.g. L) is not particularly limited. It may be optionally substituted C1-C6 alkyl in which one or two of the C atoms have optionally been replaced with hetero atoms. The hetero atoms may be selected from O, N, S or Si, typically O or N, typically O. The covalent linker may be C1-C6 alkyl.

R is typically H or C1-C6 straight chain alkyl, e.g. H or C1-3 straight chain alkyl. R may preferably be H.

The picolinamide functional group may be a 2-picolinamide, 3-picolinamide or 4-picolinamide, preferably 2-picolinamide which chelates nickel at low pH.

The 2-picolinamide and its attachment to the solid support may be illustrated by Formula 2:

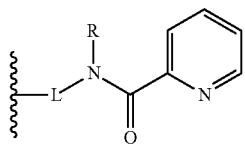

Formula 2 in which L is a covalent linker and R is H or optionally substituted, branched or straight chain C1-C6 alkyl as previously described.

The separation material has a nickel loading capacity of at least 10 mg g$^{-1}$. The nickel loading capacity may be determined by contacting 20 mL of Ni sulphate solution having a Ni concentration of 200 ppm at pH 2.0 with 0.062 g of separation material and stirring at 25° C. for 18 hours. The concentration of Ni remaining in the solution is determined by ICP-OES and compared with a blank solution which has not been contacted with the separation material to determine the mass of Ni loaded on the separation material (the Ni loading capacity).

The solid support is typically a polymer or resin solid support. It may be in the form of beads. The support may be porous. A particularly suitable solid support is silica. Without wishing to be bound by theory, it is believed that silica supports provide a high density of attachment points for the picolinamide functional group, providing a high density of binding sites for Ni, thereby providing a separation material with a high Ni capacity. Other suitable solid supports include optionally cross-linked methacrylate polymer solid supports, silica-polymer composite solid supports and polystyrene.

The separation material comprising picolinic acid amide functional groups may be prepared by a method which comprises providing amine functional groups on the solid support (preferably primary amines) and reacting with picolinic acid. The solid support may be as defined above. The reaction with picolinic acid may be carried out in the presence of 1,1'-carbonyldiimidazole. The reaction with picolinic acid may be carried out for at least 5, 10 for 15 hours, e.g. under reflux conditions.

The separation material removes free base metal species (e.g. base metal not forming part of an electrocatalyst) from the dispersion e.g. by adsorbing free base metal species. Accordingly, step ii) of the first aspect of the invention is a step of contacting the dispersion with a separation material comprising picolinic acid ester or picolinic acid amide functional groups immobilised on a solid support, to reduce the amount of free base metal species from the dispersion i.e. reduce the amount by at least 50%, at least 25%, or at least 10%, preferably remove substantially all of the free base metal species. A base metal is tin or a transition metal which is not a noble metal. A noble metal is a platinum group metal (platinum, palladium, rhodium, ruthenium, iridium or osmium) or gold. Suitable base metals are iron, copper, cobalt, nickel, zinc, iron, titanium, molybdenum, vanadium, manganese, niobium, tantalum, chromium and tin. The amount of free base metal species in the dispersion prior to contacting with the separation material is not particularly limited and may be, for example, no more than 3000 ppm, suitably no more than 2500 ppm. The separation material is capable of adsorbing base metal species. In particular those of, for example, nickel and cobalt, preferably cations, for example $Ni^{2+}$, $Co^{2+}$. The separation material is particularly capable of adsorbing nickel species, preferably cations, for example $Ni^{2+}$. Accordingly, the free base metal species removed from the dispersion may suitably be nickel and cobalt, preferably cations, for example $Ni^{2+}$, $Co^{2+}$, in particular nickel species, preferably cations, for example $Ni^{2+}$. Whilst it is not a requirement of the present invention, the base metal species may arise from unintentional leaching of an alloy electrocatalyst or otherwise. For example, free nickel and/or cobalt species may arise from leaching of an electrocatalyst which is an alloy of a platinum group metal with nickel or cobalt during an agglomerate break-up step performed during preparation of the dispersion comprising an electrocatalyst material, an ion-conducting material and a diluent.

Suitably, the separation material does not adsorb platinum group metals and as such does not separate platinum group metals from the dispersion, for example, the separation material may adsorb less than 0.05 wt % platinum group metals, preferably less than 0.02 wt % platinum group metals, by total weight of the bound metal species and the separation material.

The amount of separation material used can be expressed in terms of the weight ratio of separation material to electrocatalyst material. The amount used is not particularly limited, but it is advantageous that a relatively small amount with respect to the electrocatalyst material can be used. Suitably, the weight ratio of separation material to electrocatalyst material is in the range of and including 1:20 to 1:1, preferably 1:20 to 1:3, more preferably 1:20 to 1:5.

The separation material may be contacted with the dispersion by dispersing the separation material in the dispersion. To remove the separation material, the dispersion can be filtered. Preferably, although it is not necessary, the dispersion containing the separation material is agitated. The manner in which the dispersion is agitated is not particularly limited, and a skilled person will be aware of suitable agitation methods, for example stirring or barrel rolling. A preferred method is barrel rolling. The dispersion is suitably agitated for no more than 72 hours, for example no more than 48 hours, preferably no more than 24 hours. The dispersion is suitably agitated for at least 1 h. Typically, the separation material is removed at the time the electrocatalyst ink is required for forming an electrocatalyst layer e.g. the electrocatalyst ink is prepare and used instantly. However, this is not a requirement, and the separation material can be removed at any time prior to forming an electrocatalyst layer, within the lifetime of the electrocatalyst ink. No heating is required which could damage the ink.

Alternatively, the separation material may be contacted with the dispersion by passing the dispersion through a column packed with the separation material. Preferably, no additional diluents are added when the dispersion is passed through such a column. The size of the column, the pressure used and the contact time between the dispersion and the separation material are not particularly limited and a skilled person will be able to identify appropriate conditions based on, e.g., the mass, constituents, and solid content of the dispersion.

Alternatively, the separation material may be contacted with the dispersion by placing a vessel containing the separation material in the dispersion, wherein the vessel is permeable to the dispersion, but is not permeable to the separation material. Accordingly, the separation material will not become dispersed in the dispersion. Rather, the dispersion will enter through the permeable walls of the vessel and contact the separation material whilst it remains in the vessel. Advantageously, no filtering step is required and the vessel containing the separation material can simply be removed from the dispersion at the required time. The identity of the vessel is not particularly limited and may be, for example, a sealed mesh bag having apertures of the correct dimension to be permeable to the dispersion but not the separation material. For example, the vessel may be prepared using a heat sealable polyethylene or polypropylene mesh. Whilst the vessel is in the dispersion, the dispersion may be agitated and a skilled person will be aware of suitable agitation methods, for example stirring or barrel rolling.

It is advantageous that the contact between the dispersion and the separation material can be carried out at ambient temperature, e.g. in the range of and including 20 to 25° C., so no heating is required which could damage the ink. It is also advantageous that the benefits of the invention can be realised without having to alter the natural pH of the dispersion i.e. the separation material will adsorb base metal species at pH less than 3.

The electrocatalyst ink may comprise additional components, which are preferably added after contact with the separation material. Such components include, but are not limited to: an oxygen evolution catalyst; a hydrogen peroxide decomposition catalyst; a hydrophobic agent (e.g. a polymer such as polytetrafluoroethylene (PTFE) or an inorganic solid with or without surface treatment) or a hydrophilic agent (e.g. a polymer of an inorganic solid, such as an oxide) to control reactant and water transport characteristics. The choice of additional components is within the capability of a skilled person to determine and will depend on the nature of the electrocatalyst layer to be prepared using the ink. Any additional solid components are included in the electrocatalyst ink solid contents recited herein.

The third aspect of the invention may also be considered as a method of preparing an electrocatalyst layer. In the third aspect of the invention, the electrocatalyst ink may be applied to a substrate by any suitable technique known to those in the art. Such techniques include, but are not limited to, gravure coating, slot die (slot, extrusion) coating, screen printing, rotary screen printing, inkjet printing, spraying, painting, bar coating, pad coating, gap coating techniques such as knife or doctor blade over roll, and metering rod application. The applied electrocatalyst ink is formed into an electrocatalyst layer by drying. The drying method is not particularly limited, and a skilled person will be able to identify a suitable method. For example, the electrocatalyst ink may be heated to a temperature in the range of and including 50 to 250° C.

The electrocatalyst layer may be a cathode or an anode, preferably of a proton exchange membrane fuel cell. The characteristics of the electrocatalyst layer, such as the thickness, electrocatalyst loading, porosity, pore size distribution, average pore size and hydrophobicity will depend on whether it is being used at the anode or cathode. In particular, the electrocatalyst layer is for use at the cathode. In an anode of a proton exchange membrane fuel cell, the electrocatalyst layer thickness is suitably at least 1 µm, typically at least 5 µm. In an anode, the electrocatalyst layer thickness is suitably no more than 15 µm, typically no more than 10 µm. In a cathode of a proton exchange membrane fuel cell, the electrocatalyst layer thickness is suitably at least 2 µm, typically at least 5 µm. In a cathode, the electrocatalyst layer thickness is suitably no more than 20 µm, typically no more than 15 µm.

The electrocatalyst loading in the electrocatalyst layer will also depend on the intended use. In this context, electrocatalyst loading means the amount of active metal, for example platinum group metal, in the electrocatalyst layer. So, when the electrocatalyst is an alloy of platinum, the electrocatalyst loading is the amount of platinum per unit area expressed as mg/cm$^2$. In a fuel cell cathode electrocatalyst loading is suitably at least 0.05 mg/cm$^2$, for example no more than 0.7 mg/cm$^2$, preferably no more than 0.3 mg/cm$^2$. In a fuel cell anode, the loading of platinum in the electrocatalyst layer is suitably at least 0.02 mg/cm$^2$, for example no more than 0.2 mg/cm$^2$, preferably no more than 0.15 mg/cm$^2$.

In the fifth aspect of the invention, the electrocatalyst ink may be deposited onto a gas diffusion layer to form a gas diffusion electrode of the invention i.e. a gas diffusion layer combined with the electrocatalyst layer of the invention. The gas diffusion layer comprises a gas diffusion substrate and, preferably, a microporous layer. When a microporous layer is present, the electrocatalyst ink is deposited onto the microporous layer. Typical gas diffusion substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from Ballard Power Systems Inc.), or woven carbon cloths. The carbon paper, web or cloth may be provided with a pre-treatment prior to fabrication of the electrode and being incorporated into a membrane electrode assembly either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. Typical microporous layers comprise a mixture of a carbon black and a polymer such as polytetrafluoroethylene (PTFE).

In the seventh aspect of the invention, the electrocatalyst ink may be applied to a decal transfer substrate to form a catalysed decal transfer substrate of the invention. A catalysed decal transfer substrate of the invention comprises a decal transfer substrate and an electrocatalyst layer of the invention. Additional layers may be deposited on the exposed face of the electrocatalyst layer prior to removal of the decal transfer substrate; for example, an ion-conducting ionomer layer may be applied from a dispersion of ionomer using any suitable deposition technique known as described above in relation to deposition of the electrocatalyst layer. Further additional layers can be added as required, for example as described in PCT Patent Application No. WO2015/050864. The decal transfer substrate is removed from the electrocatalyst layer at an appropriate time. The decal transfer substrate may be formed from any suitable material from which the electrocatalyst layer can be removed without damage. Examples of suitable materials include a fluoropolymer, such as polytetrafluoroethylene (PTFE), ethylene tetrafluoroethylene (ETFE), perfluoroalkoxy polymer (PFA), fluorinated ethylene propylene (FEP—a copolymer of hexafluoropropylene and tetrafluoroethylene) and polyolefins, such as biaxially oriented polypropylene (BOPP).

In the ninth aspect of the invention, electrocatalyst inks of the invention may be applied directly to one or both faces of an ion-conducting membrane to form a catalyst coated ion-conducting membrane of the invention. For example, one ink will contain a cathode electrocatalyst, and the other ink an anode electrocatalyst. If the electrocatalyst ink of the invention is only applied to one face of the ion-conducting membrane then an electrocatalyst layer can be applied to the other face by other, conventional, means. Alternatively, in the tenth aspect of the invention, a catalyst coated membrane of the invention may be prepared by transferring an electrocatalyst layer of the invention from a catalysed decal transfer substrate of the invention to one or both faces of an ion-conducting membrane. If an electrocatalyst layer of the invention is transferred to one face of the ion-conducting membrane, then an electrocatalyst layer can be applied to the other face by other, conventional means. An ion-conducting membrane of the invention may also be prepared by a mixture of the ninth and tenth aspects of the invention i.e. one electrocatalyst layer may be applied in accordance with the method of the ninth aspect of the invention, and the other electrocatalyst layer may be applied in accordance with the method of the tenth aspect of the invention.

The faces of the ion-conducting membrane referred to herein are separated by the thickness of the ion-conducting membrane. A skilled person will understand thickness to mean the measurement in the through-plane, z-direction. The opposing faces extend perpendicularly to the thickness i.e. in the x-y-plane. Preferably, the ion-conducting membrane is any membrane suitable for use in a proton exchange membrane fuel cell, for example the membrane may be based on a perfluorinated sulphonic acid material such as Nafion® (Chemours Company), Aquivion® (Solvay Specialty Polymers), Flemion® (Asahi Glass Group) and Aciplex® (Asahi Kasei Chemicals Corp.). Alternatively, the membrane may be based on a sulphonated hydrocarbon membrane such as those available from FuMA-Tech GmbH as the Fumapem® P, E or K series of products, JSR Corporation, Toyobo Corporation, and others.

The thickness of the ion-conducting membrane is not particularly limited and will depend on the intended application of the ion-conducting membrane. For example, typical fuel cell ion-conducting membranes have a thickness of at least 5 μm, suitably at least 8 μm, preferably at least 10 μm. Typical fuel cell ion-conducting membranes have a thickness of no more than 50 μm, suitably no more than 30 μm, preferably no more than 20 μm. Accordingly, typical fuel cell ion-conducting membranes have a thickness in the range of and including 5 to 50 μm, suitably 8 to 30 μm, preferably 10 to 20 μm.

The ion-conducting membrane may comprise additional components such as peroxide decomposition catalysts and/or radical decomposition catalysts, and/or recombination catalysts. Recombination catalysts catalyse the recombination of unreacted $H_2$ and $O_2$ which can diffuse into the ion-conducting membrane from the anode and cathode of a fuel cell respectively, to produce water. The ion-conducting membrane may also comprise a reinforcement material, such as a planar porous material (for example expanded polytetrafluoroethylene (ePTFE) as described in USRE37307), embedded within the thickness of the ion-conducting membrane, to provide for improved mechanical strength of the ion-conducting membrane, such as increased tear resistance and reduced dimensional change on hydration and dehydration, and thus further increase the durability of a membrane electrode assembly and lifetime of a fuel cell incorporating the catalysed ion-conducting membrane of the invention. Other approaches for forming reinforced ion-conducting membranes include those disclosed in U.S. Pat. Nos. 7,807,063 and 7,867,669 in which the reinforcement is a rigid polymer film, such as polyimide, into which a number of pores are formed and then subsequently filled with the PFSA ionomer.

Any reinforcement present may extend across the entire thickness of the ion-conducting membrane or may extend across only a part of the thickness of the ion-conducting membrane. It may further be advantageous to reinforce the perimeter of the first and second surface of the ion-conducting membrane to a greater extent than the central face of the first and second surface of the ion-conducting membrane. Conversely, it may be desirable to reinforce the centre of the first or second surface of the ion-conducting membrane to a greater extent than perimeter of the first or second surface of the ion-conducting membrane.

The process for preparing a membrane electrode assembly of the twelfth aspect of the invention may suitably be carried out as follows:
  (i) applying a gas diffusion electrode of the invention to each face of an ion-conducting membrane. Preferably, the layers are then laminated together;
  (ii) applying a gas diffusion electrode of the invention to one face of a catalyst coated ion-conducting membrane in which only one side comprises an electrocatalyst layer, and applying a gas diffusion layer to the electrocatalyst layer. The catalyst coated ion-conducting membrane may be a catalyst coated ion-conducting membrane of the invention comprising an electrocatalyst layer of the invention.

The process for preparing a membrane electrode assembly of the fourteenth aspect of the invention may suitably be carried out as follows:
  (i) applying gas diffusion layers to both electrocatalyst layers of an ion-conducting membrane of the invention;
  (ii) applying a gas diffusion electrode to one face of an ion-conducting membrane of the invention in which only one side comprises an electrocatalyst layer, and applying a gas diffusion layer to the electrocatalyst layer. The gas diffusion electrode may be a gas diffusion electrode of the invention.

Whilst the invention has being discussed mainly with reference to its use in the preparation of electrocatalyst inks for fuel cell electrocatalyst layers, a skilled person will understand that the method is applicable to the preparation of electrocatalyst inks for electrolyser electrocatalyst layers. The benefits associated with removing base metal contaminants apply to electrolyser electrocatalyst inks. Accordingly, the first aspect of the invention may be a method of preparing an electrocatalyst ink for an electrolyser electrocatalyst layer, preferably a proton exchange membrane electrolyser catalyst layer. Also, the electrocatalyst layer of the invention may be an electrolyser electrocatalyst layer, preferably a proton exchange membrane electrolyser electrocatalyst layer. Also, in a seventeenth aspect, the present invention provides an electrolyser comprising a membrane electrode assembly of the invention. Preferably, the electrolyser is a proton exchange membrane electrolyser.

EXAMPLES

Preparation Example 1—Preparation of Picolinamide Functionalised Silica

Picolinic acid (0.75 g) was placed in a 250 mL three-neck round-bottom flask reactor. Then, 60 mL of dichloromethane (DCM) was added to the reactor and the reactor placed on a hotplate fitted with a paddle stirrer powered by overhead motor with a gas tight stirrer gland and a calcium chloride guard. The mixture was stirred until the picolinic acid was completely dissolved. Then, 1,1'-carbonyldiimidazole (CDI) (0.97 g) was slowly added to the reactor (bubbling, $CO_2$ by-product being released) and mixed for 30 minutes. Silica-AP (5.0 g dry mass, as prepared in Example 1) was added to the reactor. The mixture was stirred at 50 rpm and refluxed overnight (external temperature 50° C.). The reactor was allowed to cool down, the solid was filtered, washed with DCM, methanol and deionised water (3×20 mL each step) and dried in a vacuum oven at 40° C.

The reaction scheme for this reaction is below:

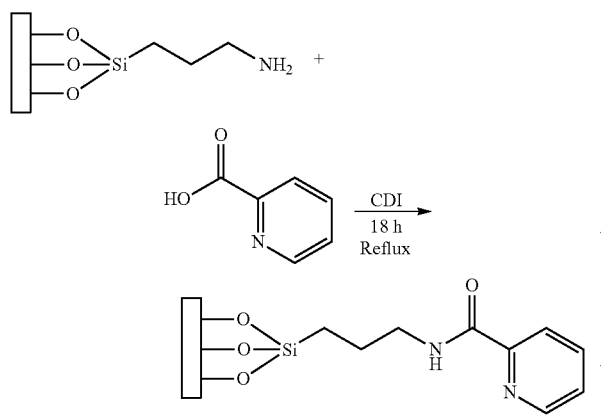

Preparation Example 2—Preparation of Picolinamide Functionalised Polystyrene

Picolinic acid (3.1 g) was dispersed in 30 mL of DCM in a 100-mL 3-neck round-bottom flask with continuous stirring by an over-head stirrer. Then, CDI (4.1 g) was added to the reactor with evolution of some effervescence due to the release of $CO_2$. Once the effervescence finished (approx. 30 min), an amine-functionalised poly(styrene-co-divinylbenzene), (Lewatit® VP OC 1065; 5.0 g), was added to the reactor and the reaction heated to reflux in anhydrous conditions ($CaCl_2$ guard) overnight. The final product was given as a dark-grey solid which was filtered off, washed with DCM by soxhlet extraction for 10 cycles, washed with water and dried under vacuum at 40° C. for 6 h.

The reaction scheme for this reaction is below:

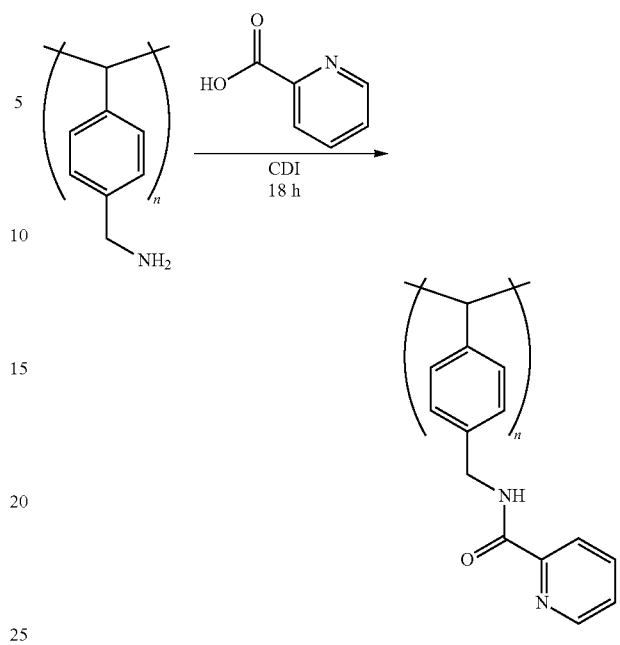

Nickel Loading

The nickel loading capacity of Resin A (picolinamide functionalised silica as prepared in Preparation Example 1) and Resin B (picolinamide functionalised polystyrene as prepared in Preparation Example 2) was tested using a single point capacity test according to the following protocol.

Determination of metal adsorption capacity of the resins was carried out using 20 mL of nickel sulphate solution with a nickel concentration of 200 ppm at pH 2.0. The metal solution was made by dissolving the appropriate mass of the sulfate salt in deionised water and the pH adjusted with sulfuric acid. The different materials are weighed out in multiple parallel tubes with a set mass of 0.062 g. The resin and the solution were contacted and stirred for 18 hours. All samples, including an un-treated blank were analysed by ICP-OES. The metal concentration of the blank (un-treated) sample is compared against the concentration of the treated sample and the metal capacity is described as mass of metal adsorbed by mass of resin (mg $g^{-1}$).

The results are shown in Table 2 below:

TABLE 2

| Resin | Nickel Capacity |
| --- | --- |
| Resin A | 15 mg $g^{-1}$ |
| Resin B | 3 mg $g^{-1}$ |

These results demonstrate that picolinamide-functionalised silica has a higher capacity for nickel than picolinamide-functionalised polystyrene, though both demonstrate significant nickel uptake. With such capacities at pH 2, the separation material has benefit in removing nickel ions from, for example, proton exchange membrane fuel cell catalyst layer electrocatalyst inks containing a proton conducting ionomer, without having to alter the pH of the inks and potentially damage the inks. Thus, the benefits associated with the removal of nickel ions can be readily realised.

Picolinic Acid Ester Example

The previous example utilized picolinic acid amide (picolinamide) functional groups. However, it is also possible to utilize corresponding picolinic acid ester groups in accordance with other examples of the present invention. In this regard, it has been found that picolinic acid esters can also chelate nickel. For example, an acidic solution of ethyl 2-picolinate (0.04 M) and nickel (0.01 M) was prepared and chelation was confirmed by a colour change of the solution from green to blue colour, which is the same colour as the nickel-picolinamide complex. Thus, the same benefits can be realised in electrocatalyst inks.

Preparation of Electrocatalyst Inks

An electrocatalyst ink is prepared by mixing 30 wt % PtNi/C electrocatalyst, PFSA ionomer, and solvent to form a dispersion. The ink is prepared to contain about 12 wt % solids (electrocatalyst and ionomer). The solvent used is 80 wt % 1-propanol in water or 10 wt % ethanol and 70 wt % 1-propanol in water. The mixture is bead milled together to form a well dispersed ink.

Electrocatalyst ink is then placed into a sealed container and a separation material comprising picolinic acid ester or picolinic acid amide functional groups immobilised on a solid support is added. The weight ratio of separation material to electrocatalyst material (after milling) is about 1:3. The sealed container is then barrel rolled for 48 hrs before the separation material is removed by filtration. The separating material is analysed for nickel content.

Preparation of Membrane Electrode Assemblies

A catalyst coated ion-conducting membrane of 50 $cm^2$ active area is prepared by depositing anode and cathode catalyst layers onto a PTFE sheet and transferring the appropriate layers to either face of a PFSA reinforced membrane (15 µm thickness) at a temperature of between 150° C. to 200° C.

The electrocatalyst ink prepared as above is used to prepare the cathode catalyst layer at a loading of 0.2 $mgPt/cm^2$. The anode catalyst layer comprises an anode electrocatalyst (HiSPEC® 3000 with a nominal platinum loading of 20 wt % platinum on the carbon support) at a loading of 0.08 $mgPt/cm^2$.

A gas diffusion layer is applied to each face of the catalyst coated ion-conducting membrane to form the complete membrane electrode assembly. The gas diffusion layer is a carbon fibre paper with a hydrophobic microporous layer containing carbon and PTFE (Sigracet® 22BB from SGL Technologies GmbH) applied to the face in contact with the catalyst coated ion-conducting membrane.

While this invention has been particularly shown and described with reference to certain examples, it will be understood to those skilled in the art that various changes in form and detail may be made without departing from the scope of the invention as defined by the appended claims.

The invention claimed is:

1. A method of preparing an electrocatalyst ink, the method comprising the steps of:
   i) preparing a dispersion comprising an electrocatalyst material, an ion-conducting material and a diluent; then
   ii) contacting the dispersion with a separation material comprising picolinic acid ester or picolinic acid amide functional groups immobilised on a solid support.

2. The method according to claim 1, wherein the ion-conducting material is a proton conducting ionomer.

3. The method according to claim 1, wherein the electrocatalyst material comprises an electrocatalyst which is a platinum group metal or an alloy of a platinum group metal with a base metal.

4. The method according to claim 1, wherein the electrocatalyst is supported on a support material.

5. The method according to claim 1, wherein step i) includes a step of breaking up agglomerates in the dispersion.

6. The method according to claim 5, wherein the step of breaking up agglomerates in the dispersion is carried out by ball milling.

7. The method according to claim 1, wherein step ii) comprises dispersing the separation material in the dispersion prepared in step ii), and the method further comprises a step iii) of filtering the dispersion to remove the separation material.

8. The method according to claim 7, wherein the dispersion is agitated in step ii).

9. The method according to claim 1, wherein step ii) comprises passing the dispersion through a column packed with the separation material.

10. The method according to claim 1, wherein step ii) comprises placing a vessel containing the separation material in the dispersion, wherein the vessel is permeable to the dispersion, but is not permeable to the separation material.

11. A method of applying an electrocatalyst layer to a substrate, the method comprising the steps of:
   i) preparing an electrocatalyst ink by the method of claim 1; then
   ii) applying the electrocatalyst ink onto the substrate and drying the ink to form an electrocatalyst layer.

12. A method of preparing a gas diffusion electrode, the method comprising applying an electrocatalyst layer to a substrate according to the method of claim 11, wherein the substrate is a face of a gas diffusion layer.

13. A method of preparing a membrane electrode assembly, the method comprising the steps of;
   i) preparing a gas diffusion electrode according to the method of claim 12;
   ii) applying the gas diffusion electrode prepared in step i) to a face of an ion-conducting membrane.

14. A method of preparing a catalysed decal transfer substrate, the method comprising applying an electrocatalyst layer to a substrate according to the method of claim 11, wherein the substrate is a face of a decal transfer substrate.

15. A method of preparing a catalyst coated ion-conducting membrane, the method comprising preparing a catalysed decal transfer substrate according to the method of claim 14 and applying an electrocatalyst layer to an ion-conducting membrane by decal transfer from the catalysed decal transfer substrate.

16. A method of preparing a membrane electrode assembly, the method comprising the steps of;
   i) preparing a catalyst coated ion-conducting membrane according to the method of claim 15;
   ii) applying a gas diffusion layer to the electrocatalyst layer.

17. A method of preparing a catalyst coated ion-conducting membrane, the method comprising applying an electrocatalyst layer to a substrate according to the method of claim 11, wherein the substrate is a face of an ion-conducting membrane.

18. A method of preparing a membrane electrode assembly, the method comprising the steps of,
   i) preparing a catalyst coated ion-conducting membrane according to the method of claim 17;
   ii) applying a gas diffusion layer to the electrocatalyst layer.

* * * * *